United States Patent [19]

Vauthier

[11] 4,205,943
[45] Jun. 3, 1980

[54] HYDRO-ELECTRIC GENERATOR

[76] Inventor: Philippe Vauthier, c/o General Delivery, Annapolis, Md. 21403

[21] Appl. No.: 872,131

[22] Filed: Jan. 25, 1978

[51] Int. Cl.² .......................... F03D 1/06; F03B 13/10
[52] U.S. Cl. .......................................... 416/86; 416/91; 416/171; 416/175; 416/189; 290/54
[58] Field of Search .................................... 416/84–86, 416/91, 121 A, 189 A, 171, 122 A, 175 A, DIG. 4; 415/7, 8, 80, 81, 201; 290/43.44, 54.55

[56] References Cited

U.S. PATENT DOCUMENTS

| 2,974,627 | 3/1961 | Whipple | 416/84 X |
| 3,986,787 | 10/1976 | Mouton et al. | 415/7 |
| 4,025,220 | 5/1977 | Thompson et al. | 415/7 |
| 4,095,918 | 6/1978 | Mouton et al. | 415/7 |

FOREIGN PATENT DOCUMENTS 170460 2/1952 Austria ........................................ 416/85

*Primary Examiner*—Everette A. Powell, Jr.
*Attorney, Agent, or Firm*—Blum, Kaplan, Friedman, Silberman & Beran

[57] ABSTRACT

The efficiency of a hydro-electric generator is improved by providing open-ended hollow tubes having influx ends proximate the axis and efflux ends proximate the periphery of a fan-bladed turbine. The jets of water developed by rotation of the fan-bladed turbine are directed against turbine vanes at the periphery of the fan blades. The device is particularly suitable for mounting in a water current such as in an ocean current or river.

9 Claims, 4 Drawing Figures

4,205,943

HYDRO-ELECTRIC GENERATOR

BACKGROUND OF THE INVENTION

Devices for utilizing the energy in a current of water are of ancient origin and range from the mill wheel, used for grinding grain, to the hydro-electric generators which tap the energy of Niagara Falls. Useful energy has also been derived from currents of air by devices such as the windmill. The support frames for both the hydro-electric generator and the windmill are firmly anchored to the ground. Recently, the possibility of extracting energy from air currents has been explored by a number of inventors, as taught in U.S. Pat. Nos. 2,485,543; 2,784,556; 3,924,827 and 3,987,987. The last two patents are particularly interesting in that they disclose devices which are supported by air currents in the manner of kites. The significance of this feature will become evident in connection with the principal embodiment of the present invention.

A major disadvantage in attempting to utilize wind energy stems from the fact that the density of air is so low that considerable amounts of energy can be derived from air currents only by the use of impracticably large devices. However, the density of water is such that relatively small devices can provide substantial quantities of energy, provided the water velocity is of sufficient intensity.

Up to the present time, hydro-electric generators have been, for the most part, of the type in which the frame is anchored to the ground. Accordingly, such generators cannot readily take advantage of water currents such as in the middle of a stream, and cannot be adapted to take advantage of water currents where the direction of the current may vary with the time of day or with the tides. Accordingly, a hydro-electric generator which can adapt its position and orientation to the direction of flow of the water in which it is positioned and which can produce electricity at a high efficiency is greatly to be desired.

SUMMARY OF THE INVENTION

A hydro-electric generator employs a conventional anchorage cable for holding the generator in a current of water and control cables for establishing the depth and orientation of the generator. The generator itself has a first stage in the form of a fan and a second stage which includes hollow tubing mounted essentially radially on the fan. Water is accelerated through the hollow tubing against turbine blades which drive generators mounted on the periphery of the fan.

In a preferred embodiment the fan blades are hollow so that the fan blades constitute the radial hollow tubing. The entrance end of each of the hollow tubes may be oriented in the upstream direction relative to the current which rotates the fan. Also, each of the hollow tubes may be tapered so that the entrance end of each tube is of larger diameter than the exit end, such a construction increasing the velocity of the jets emerging from the efflux ends of the hollow tubes.

Accordingly, it is an object of the present invention to provide a hydro-electric generator improved efficiency.

Another object of the present invention is a hydro-electric generator of improved efficiency for utilizing the kinetic energy of a water stream and converting same into electrical energy.

A further object of the present invention is a hydro-electric generator of improved efficiency for utilizing the energy in a water current such as in an ocean current, river or the like, where the generator can be positioned and oriented to take maximum advantage of the direction of flow of the current.

An important object of the present invention is a hydro-electric generator of improved efficiency consisting of two stages where the second stage includes radially-positioned hollow tubes for developing water jets by means of the centrifugal force produced in a first-stage of said generator and said jets being utilized to drive turbo-generators in a second stage.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
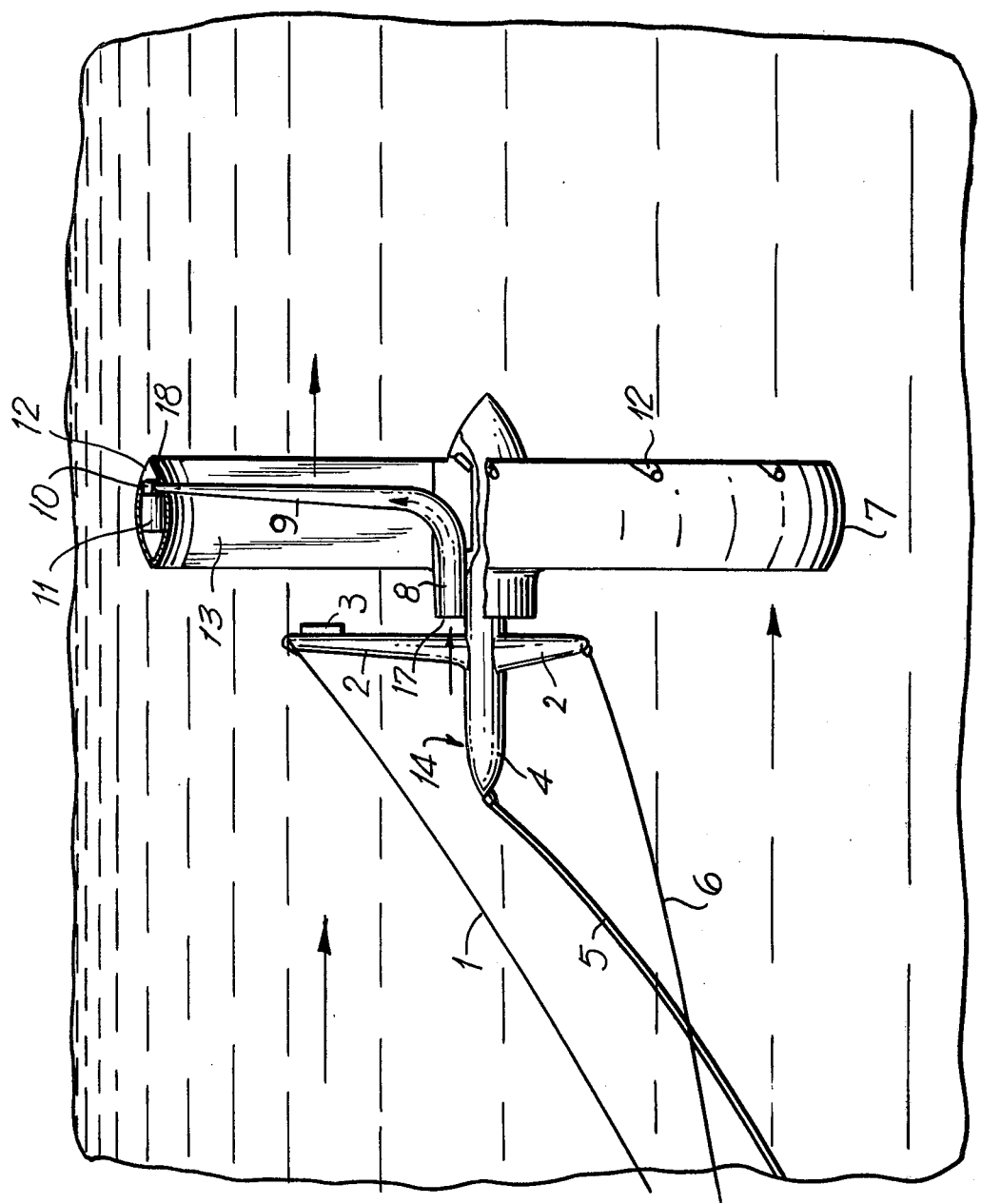
FIG. 1 is a side view, in partial section, of an embodiment of the invention.

As is shown in FIG. 1, a hydro-electric generator in accordance with the present invention is mounted on a frame, indicated generally by the reference numeral 14, the frame being anchored by main cable 5 which also includes the power line. The means for positioning the frame and the generator mounted thereon include a towing and fixed anchorage cable 1, axle fix 4 which incorporates a power collector and controls, fixed support arms 2, and anti-torque rudder 3 mounted on one of the fixed support arms 2 and depth control cables 6.

Figure 2:
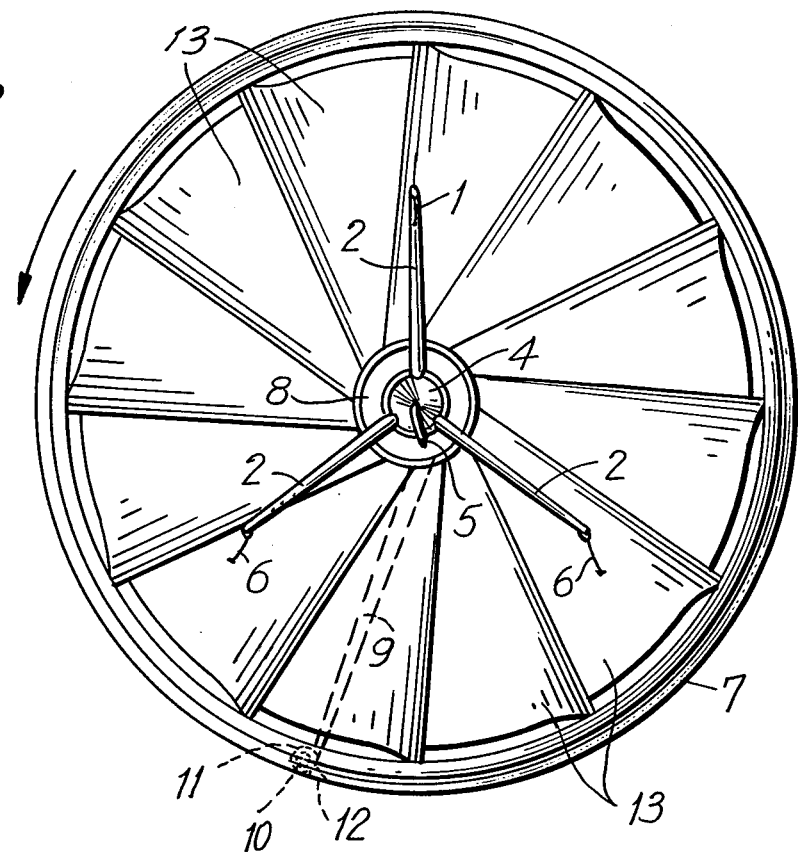
FIG. 2 is a front view in partial section of the embodiment of FIG. 1.
Figure 4:
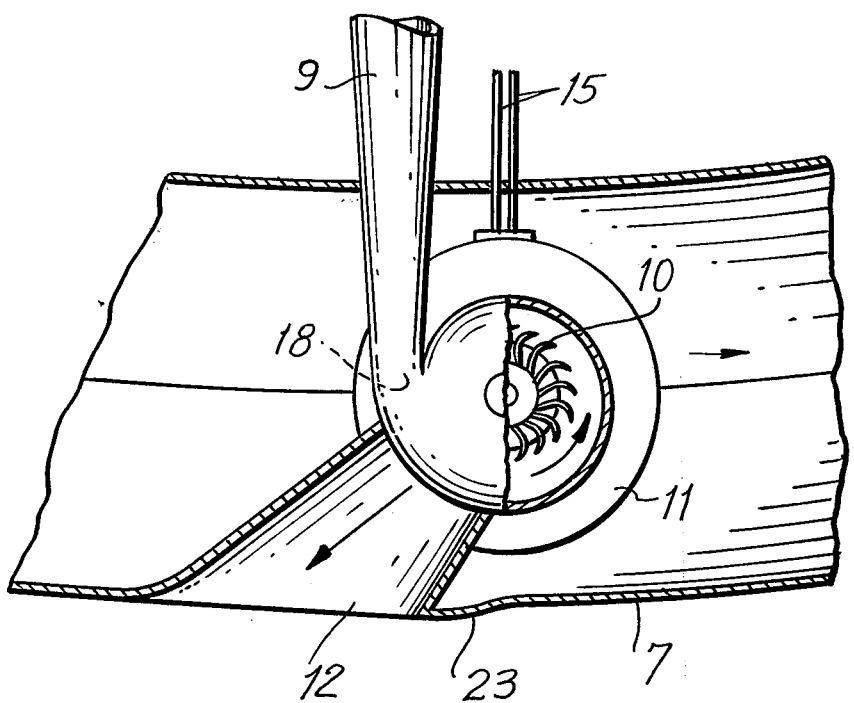
FIG. 4 is a partial view of the second stage of the hydro-electric generator.
Figure 3:
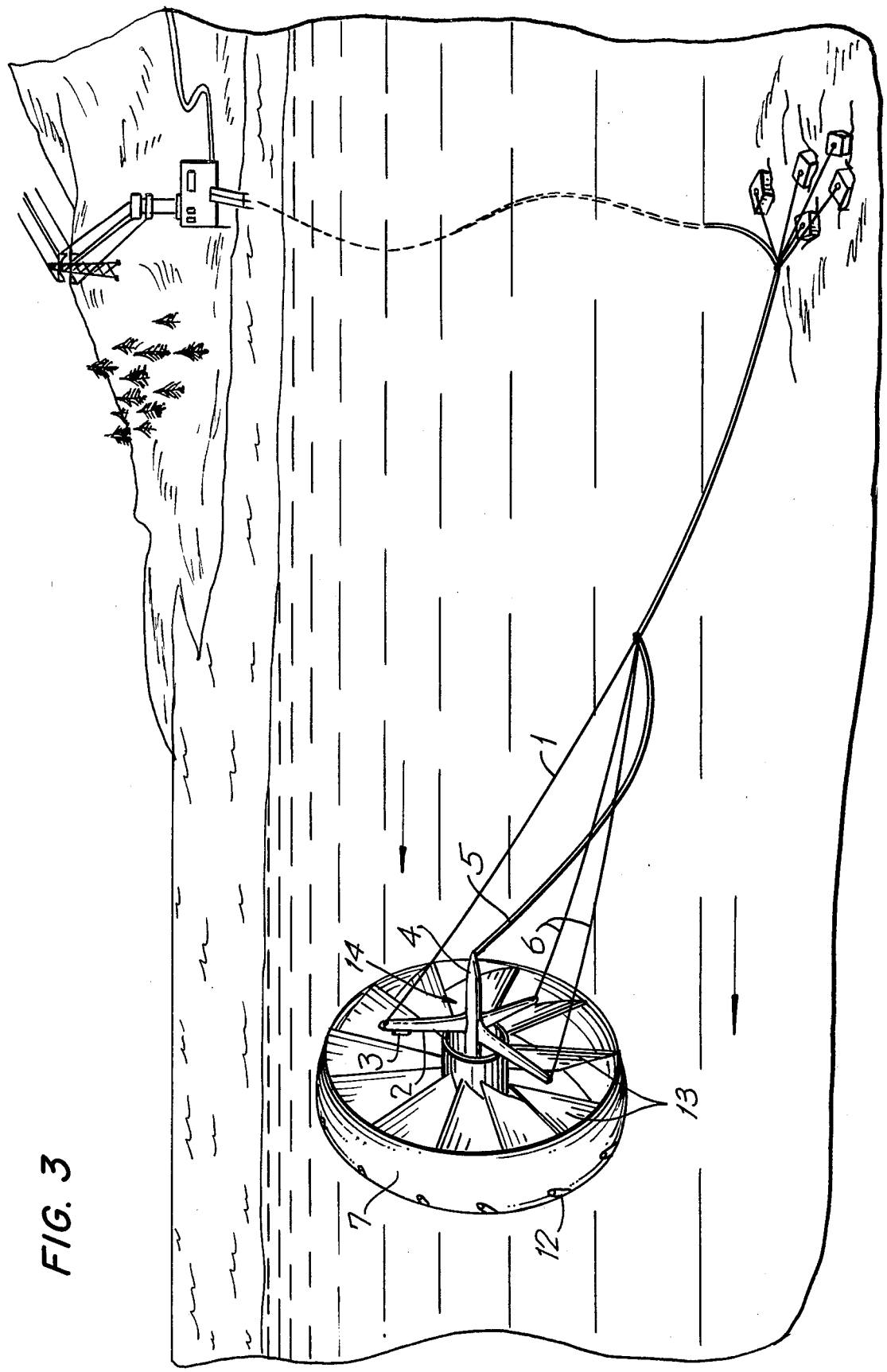
FIG. 3 is a perspective view of the embodiment of FIG. 1 showing the location of same in a water current.

The hydro-electric generator has a first stage consisting principally of fan blades 13 as can best be seen in FIG. 2. Assuming that the view of the hydro-electric generator is from the upstream side, the fan will rotate in the direction indicated by the arrow, namely counter-clockwise. Of course, the direction of rotation will depend upon the pitch of the fan blades.

The second stage of the hydro-electric generator includes hollow tubes 8, each having an influx end 17 and an efflux end 18. Preferably, influx end 17 is oriented in the upstream direction relative to the water current so that the water enters the influx end smoothly and without turbulence and flows through the hollow tube 9 to the efflux end 18, the water being accelerated by and collecting energy by centrifugal force from the rotation of the first stage fan blades. In a preferred form the fan blades are hollow and the water flows through the fan blades from influx end 17 to efflux end 18.

The force on the water in the hollow tube is given by the following formula:

$$F = (\pi^2 S^2 M R)/900 \qquad \text{(Eq. 1)},$$

where $S^2$ is the cross-sectional area of the inside of the tube, M is the mass of the water and R is the instantaneous radius of the circle in which a given volume of water is rotating. The velocity of the water is shown in Equation 2.

$$V^3 = 2\pi\omega R \qquad \text{(Eq. 2)},$$

where $\omega$ is the angle of velocity of the fan blades and the hollow tubes. The artificial head ("AH") generated by the rotation of the first stage is:

$$A.H. = m\pi\omega R^2 \qquad \text{(Eq. 3)}.$$

The energy developed by the second stage of the turbine is given by the equation:

$$E = \pi^3 \omega^2 R^4 T \qquad \text{(Eq. 4)},$$

where T is time.

To utilize the energy of the water jets, a turbine 10 is mounted at the periphery of the fan blades in a hollow ring 7, the hollow ring being a hydrodynamic housing of donut shape. The water jet, emerging from effluent end 9, strikes against turbine vanes 10 of generator 11, the vanes 10 being oriented for converting the energy in the water jets into rotation of the generator 11. The current developed by generator 11 is taken therefrom along wires 15 which are connected with the main cable 5. The water from the jets, after passing through vanes 10 of generator 11, are discharged through outlets 12 in the housing 7. The outlets 12 are each positioned downstream with respect to the direction of rotation of the fan blade 13 and prime current in order to create vacuum pressure at the respective outlet and thereby provide an additional force (suction) at the vanes for discharging and returning the water passing through the turbine vanes into the body of water in which the generator is positioned. Additionally, a raised projection 23 can be disposed upstream of said outlet, with respect to the direction of rotation of said fan blade 13, in order to create a Venturi effect and further increase the exaustive force created by the positioning of the outlet in the manner detailed above.

The higher efficiency of the hydro-electric generator, disclosed herein, results from the use of the centrifugal force on water in the hollow tubes to develop high velocity jets which are then used to operate generators at the periphery of a first stage turbine which, in turn, is actuated by a water current. Due to the fact that the device is provided with appropriate cables and controls for maintaining the position of same in a current of water, it becomes possible to free the hydro-electric generator from the restriction of a frame rigidly positioned with respect to the ground.

It will thus be seen that the objects set forth above, among those made apparent from the preceding description, are efficiency attained and, since certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A hydro-electric generator of improved efficiency, comprising a frame, first stage turbine means including fan blades for conversion of the kinetic energy of a water current into rotational energy, said first stage turbine means having an axle and a periphery and being mounted for rotation on said frame; second stage turbine means mounted on said first stage turbine means including hollow tubing means, each hollow tubing means having an influx end and an efflux end and being mounted essentially radially on said first stage turbine means with said influx end proximate said axle and said efflux end proximate said periphery for producing a jet of water by centrifugal action, and including turbine vanes positioned at each efflux end and oriented for receiving said jet of water and for projecting said jet in a direction such as to produce rotation of said second stage turbine means; and electro-mechanical means for converting the rotational energy of said first and second stage turbine means into electrical energy.

2. The hydro-electric generator as defined in claim 1, wherein said fan blades are hollow and constitute said hollow tubing means of said second stage turbine means.

3. The hydro-electric generator as defined in claim 1, wherein said second stage turbine means includes a ring at said periphery of said first stage turbine means, and generator means driven by said turbine vanes.

4. The hydro-electric generator as defined in claim 1, further comprising means for anchoring, positioning and orienting same in a water current, and electrical connection means for making available the electrical energy produced by said generator.

5. The hydro-electric generator as defined in claim 1, wherein said influx end has an opening and said opening is directed upstream of said water current.

6. The hydro-electric generator as defined in claim 1, wherein said hollow tubing means is of larger inside diameter at said influx end than at said efflux end.

7. The hydro-electric generator as defined in claim 1, wherein said jet of water in said hollow tubing means is produced by centrifugal action and defines a predetermined artificial head for effecting rotation of said second stage turbine vanes disposed at the efflux end of each said hollow tubing means.

8. The hydro-electric generator as defined in claim 1, wherein each said second stage turbine means includes an outlet positioned downstream with respect to the direction of rotation of said first stage turbine.

9. The hydro-electric generator as defined in claim 8, and including a projection disposed proximate to and upstream from each said outlet, with respect to the direction of rotation of said first stage turbine, for creating a Venturi effect at said outlet in response to the rotation of said first stage turbine.

* * * * *